(12) United States Patent
Akdim et al.

(10) Patent No.: US 11,167,231 B2
(45) Date of Patent: Nov. 9, 2021

(54) SWIRL GENERATING PIPE ELEMENT AND PROCESS FOR GAS-LIQUID SEPARATION USING THE SAME

(71) Applicant: FMC Separation Systems, BV, Amsterdam (NL)

(72) Inventors: Mohamed Reda Akdim, Nieuwegen (NL); Boubker Ibouhouten, Zeist (NL)

(73) Assignee: FMC Separation Systems, BV, Arnhem (NL)

( * ) Notice: Subject to any disclaimer, the term of this patent is extended or adjusted under 35 U.S.C. 154(b) by 303 days.

(21) Appl. No.: 16/074,759

(22) PCT Filed: Feb. 11, 2016

(86) PCT No.: PCT/EP2016/052876
§ 371 (c)(1),
(2) Date: Aug. 1, 2018

(87) PCT Pub. No.: WO2017/137080
PCT Pub. Date: Aug. 17, 2017

(65) Prior Publication Data
US 2019/0039006 A1 Feb. 7, 2019

(51) Int. Cl.
*B01D 45/12* (2006.01)
*B01D 45/14* (2006.01)
(Continued)

(52) U.S. Cl.
CPC .......... *B01D 45/14* (2013.01); *B01D 19/0052* (2013.01); *B01D 45/12* (2013.01);
(Continued)

(58) Field of Classification Search
CPC ....... B01D 45/14; B01D 19/0052; B01F 7/04; B01F 7/00116; B01F 13/0845;
(Continued)

(56) References Cited

U.S. PATENT DOCUMENTS

| 5,527,159 A | 6/1996 | Bozeman, Jr. et al. |
| 6,194,798 B1 | 2/2001 | Lopatinsky |

(Continued)

FOREIGN PATENT DOCUMENTS

| DE | 10300976 A1 | 7/2003 |
| WO | WO 2008/053287 A1 | 5/2008 |

OTHER PUBLICATIONS

Communication pursuant to Article 94(3) EPC issued in European Patent Application No. 16706324.7 (dated Mar. 22, 2021).

*Primary Examiner* — Dung H Bui

(57) ABSTRACT

A swirl generating pipe element for providing a rotational movement to a fluid, comprising a reluctance motor and a pipe section (9), wherein the reluctance motor comprises a stator element (1) and a rotor element (2); the stator element comprises multiple stator poles (3); the rotor element comprises a vane assembly having multiple rotor poles (4) and arranged to rotate around a rotor shaft (7) situated along the centerline of the pipe section (9), and each rotor pole has a first end (5) rotatably connected to the rotor shaft (7) and a second end (6) arranged close enough to one of the multiple stator poles (3) for a magnetic polarization to be induced in the rotor pole; and the pipe section (9) comprises a wall, having an external and an internal circumferential surface, and an inlet and an outlet for a fluid; wherein the stator element (1) and the rotor element (2) is separated by the wall (8) of the pipe section (9), and the multiple stator poles (3) are arranged at the external circumferential surface of the pipe section, and the second end (6) of the multiple rotor poles (4) are arranged adjacent to the internal circumferential surface of the pipe section, such that the vane assembly may provide a rotational movement to a fluid entering the inlet (10) of the pipe section (9).

18 Claims, 4 Drawing Sheets

(51) Int. Cl.
  *B01F 7/04* (2006.01)
  *B01D 19/00* (2006.01)
  *B01F 7/00* (2006.01)
  *B01F 13/08* (2006.01)
  *H02K 1/14* (2006.01)
  *H02K 1/24* (2006.01)
  *B04C 9/00* (2006.01)
  *B04C 3/00* (2006.01)

(52) U.S. Cl.
  CPC ...... *B01F 7/00033* (2013.01); *B01F 7/00116* (2013.01); *B01F 7/00908* (2013.01); *B01F 7/04* (2013.01); *B01F 13/0845* (2013.01); *H02K 1/146* (2013.01); *H02K 1/246* (2013.01); *B04C 2003/006* (2013.01); *B04C 2009/007* (2013.01)

(58) Field of Classification Search
  CPC . B01F 7/00908; B01F 7/00033; H02K 1/146; H02K 1/246; B04C 2009/007; B04C 2003/006
  See application file for complete search history.

(56) References Cited

U.S. PATENT DOCUMENTS

| | | | |
|---|---|---|---|
| 7,503,950 B2 * | 3/2009 | Håland | B01D 19/0063 55/315 |
| 2003/0115843 A1 * | 6/2003 | Haland | B01D 45/16 55/392 |
| 2004/0265153 A1 | 12/2004 | Torrey et al. | |
| 2009/0199708 A1 * | 8/2009 | Milo | A61M 1/3627 95/30 |
| 2012/0103423 A1 * | 5/2012 | Schook | B04C 3/06 137/1 |

* cited by examiner

SWIRL GENERATING PIPE ELEMENT AND PROCESS FOR GAS-LIQUID SEPARATION USING THE SAME

FIELD OF THE INVENTION

The present invention concerns the field of gas/liquid separation, and more particularly to a swirl generating element able to impart a centrifugal force on a gas/liquid mixture.

BACKGROUND

The removal or separation of very small (sub microns) liquid droplets from a predominant gas stream is very challenging. Most existing demisting products usually fail to efficiently separate liquid droplets of sizes in the range of 1 to 10 microns in diameter.

To achieve separation of liquid droplets of sizes less than 10 micron down to sub-micron range from a vapor stream, a very high centrifugal force is required.

In the prior art, the centrifugal force is commonly achieved by forcing a gas stream into a swirling or rotational movement by use of static guide vanes. The pressure drop of the gas stream passing such guide vanes is substantial, especially when achieving the high centrifugal force required for separating very small liquid droplets.

In the prior art, Supersonic separators (3S) are commonly used for the separation of very small liquid droplets (sizes below 10 microns) from a gas stream. An example of a 3S separator is the Twister® supersonic separator, wherein the gas stream is first forced into rotation by static guide vanes before being led through a Laval nozzle in which the liquid is removed. These separators suffer from a very high pressure drop of at least 25% compared to the inlet pressure, and are not able to separate liquid droplets from gas streams with a high liquid load as choking and erosion occurs due to the extremely high velocities.

The goal of the present invention is to provide a separator in which very small liquid droplets may be separated from a gas stream, while avoiding at least some of the disadvantages of the prior art.

SUMMARY OF THE INVENTION

The present invention is defined by the appended claims and in the following:

In a first aspect, the present invention provides a swirl generating pipe element for providing a rotational movement to a fluid, comprising a reluctance motor and a pipe section, wherein
- the reluctance motor comprises a stator element and a rotor element;
- the stator element comprises multiple stator poles;
- the rotor element comprises a vane assembly having multiple rotor poles and arranged to rotate around a rotor shaft situated along the centerline of the pipe section, and each rotor pole has a first end rotatably connected to the rotor shaft and a second end arranged close enough to one of the multiple stator poles for a magnetic polarization to be induced in the rotor pole; and
- the pipe section comprises a wall, having an external and an internal circumferential surface, and an inlet and an outlet for a fluid; wherein
- the stator element and the rotor element is separated by the wall of the pipe section, and the multiple stator poles are arranged at the external circumferential surface of the pipe section, and the second end of the multiple rotor poles are arranged adjacent to the internal circumferential surface of the pipe section, such that the vane assembly may provide a rotational movement to a fluid entering the inlet of the pipe section.

In one embodiment of the swirl generating pipe element, at least a part of the rotor poles are shaped as vanes.

In one embodiment of the swirl generating pipe element, the first end of each of the multiple rotor poles is rotatably connected to the rotor shaft by a sleeve arranged around the rotor shaft, and preferably at least one set of bearings is arranged between the rotor shaft and the sleeve.

In one embodiment of the swirl generating pipe element, the rotor shaft is pipe-shaped, providing a fluid passage through the centerline of the rotor element.

In one embodiment of the swirl generating pipe element, the rotor poles are rotatably connected to the rotor shaft via multiple vanes, each vane having a first vane end and a second vane end, the first vane end connected to an inner circumference of a rotation ring and the second vane end rotatably connected to the rotor shaft, the first end of the rotor poles are connected to an outer circumference of the rotation ring.

In one embodiment of the swirl generating pipe element, the pipe section comprises a first part separating the rotor element from the stator element having a wall thickness lower than a remaining second part of the pipe section.

In one embodiment of the swirl generating pipe element the stator element and an outer circumferential surface of the pipe section is enclosed in a pressure chamber for an above ambient pressure, i.e. the pressure chamber is able to contain an above ambient pressure.

In one embodiment, the swirl generating pipe element comprises pressure compensation means for equalizing the pressure in the pressure chamber and the pressure in the pipe section. Such means may include a fluid line and a membrane/piston assembly arranged between the pressure chamber and the pipe section, such that the pressure in the pressure chamber and the pressure in the pipe section are reciprocally regulated via a piston or membrane.

In one embodiment of the swirl generating pipe element, a layer comprising a permanent magnetic material is arranged between the rotor shaft and the sleeve.

In a second aspect, the present invention provides a liquid/gas separator comprising a swirl generating pipe element according to any of the embodiments above.

In a third aspect, the present invention provides for the use of a swirl generating pipe element according to any of the embodiments above for separating a liquid from a gas.

In an aspect not part of the present invention, the use of a pipe element, similar to the SGPE according to the invention, for generating electrical power is considered. A pipe element suitable for generating electrical power may be defined as:

A power generating pipe element for providing electrical power from a fluid stream, comprising a reluctance generator and a pipe section, wherein
- the reluctance generator comprises a stator element and a rotor element;
- the stator element comprises multiple stator poles;
- the rotor element comprises a vane assembly having multiple rotor poles and arranged to rotate around a rotor shaft situated along the centerline of the pipe section, and each rotor pole has a first end rotatably connected to the rotor shaft and a second end arranged close enough to one of the multiple stator poles for a magnetic polarization to be induced in the rotor pole; and the pipe section comprises a wall, having an external and an internal circumferential surface, and an inlet and an outlet for a fluid; wherein the stator element and the rotor element is separated by the wall of the pipe section, and the multiple stator poles are arranged at the external circumferential surface of the pipe section, and the second end of the multiple rotor poles are arranged adjacent to the internal circumferential surface of the pipe section, such that a fluid entering the inlet of the pipe section may provide a rotational movement to the vane assembly.

Such a power generating pipe element may comprise the same/similar features as the various embodiments of the SGPE described above. Alternatively, the rotor poles are permanent magnets, and the power generating pipe element follows the principles of a suitable permanent magnet generator.

BRIEF DESCRIPTION OF THE DRAWINGS

The present invention is described in detail by reference to the following drawings.

DETAILED DESCRIPTION OF AN EMBODIMENT OF THE INVENTION

Figure 1:
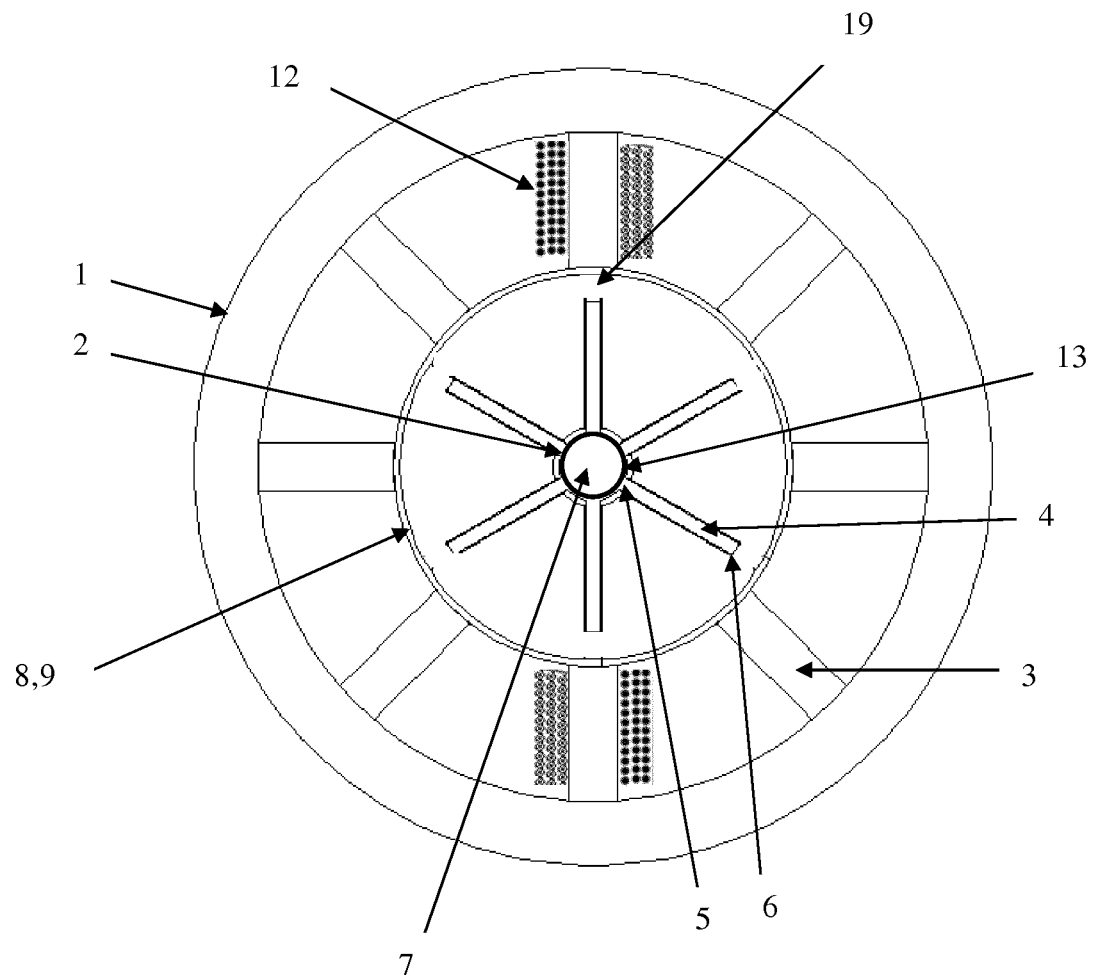
FIG. 1 is a schematic transverse cross-sectional view of a swirl generating pipe element according to the invention.

The present invention provides a swirl generating pipe element (SGPE) able to impart a very high centrifugal force on a fluid stream, for instance a gas stream. Further, use of the SGPE will avoid the pressure drop seen in the prior art solutions, and may even provide a pressure increase to the fluid stream depending on the design of the vanes (see description below). The principle behind the present invention is to impart the required centrifugal force by use of a motor-driven vane assembly arranged inside a pipe section. A simplified schematic cross-sectional view of a swirl generating pipe element is shown in FIG. 1. The SGPE features a reluctance motor, preferably a switched reluctance motor, comprising a stator element 1 and a rotor element 2. The stator element and the rotor element of the reluctance motor are separated by the wall 8 of a pipe section 9 such that the stator element is not in fluid contact with the inside of the pipe section 9. The stator element comprises multiple salient stator poles 3 (in this case eight stator poles) arranged at the external circumference of the pipe section. Each of the stator poles 3 features stator windings 12 (for simplicity the stator windings are only shown for one phase) for providing transient electromagnetic poles. The rotor element comprises multiple salient rotor poles 4 (in this case six rotor poles) having a first end 5 and a second end 6. Each rotor pole is rotatably connected, via the first end 5 and the sleeve 13, to a rotor shaft 7 arranged along the centerline of the pipe section. The second end 6 of the rotor poles are arranged close to, i.e. at a small distance 19 from, the internal circumferential surface, or wall, of the pipe section 9 (the distance 19 in FIG. 1 is exaggerated for illustrative purposes). The rotor poles 4 may be considered a part of a vane assembly in that at least parts of the rotor poles are vane shaped (as in the illustrated embodiment), or in that the rotor poles 4 are connected to a set of vanes such that said vanes will rotate around the rotor shaft 7 in response to the movement of the rotor poles. The working principles of switched reluctance motors are well known to the skilled person and are described in for instance JIn-Woo Ahn (2011), Switched Reluctance Motor, Torque Control, Prof. Moulay Tahar Lamchich (Ed.), ISBN: 978-953-307-428-3, InTech, available from: http://cdn.intechweb.org/pdfs/13717.pdf and in R. Krishnan (2001), Switched reluctance motor drives: Modelling, Simulation, Analysis, Design and Applications; CRC Press.

The rotor poles are made in a soft ferromagnetic material. Due to its superior performance when compared to more conventional magnetic materials, such as silicon-steel alloys, CoNiFe film is a preferred material for the stator pole and rotor pole laminations. CoNiFe offers flux densities up to 2 T, compared to 1.2-1.5 T for typical silicon-steels. This enables increased power density for the motor. Furthermore, the relative permeability of CoNiFe is ~5000 at 20 kHz, compared to ~1000 for silicon-steel. This reduces the effect of leakage flux and supports rotor pole design flexibility since increased permeability enables increased magnetic flux for a given excitation. Although CoNiFe is a preferred material, various other soft ferromagnetic materials may also be used.

Figure 2:
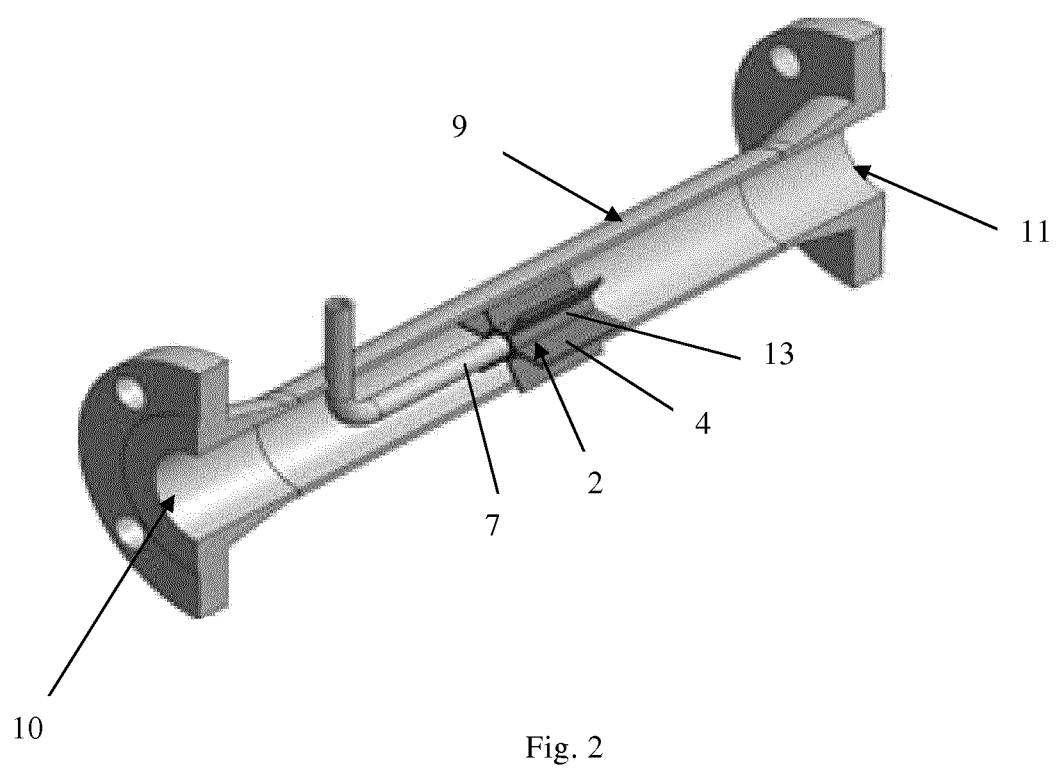
FIG. 2 is a perspective view of a swirl generating pipe element according to the invention, wherein the stator element is removed.
Figure 3:
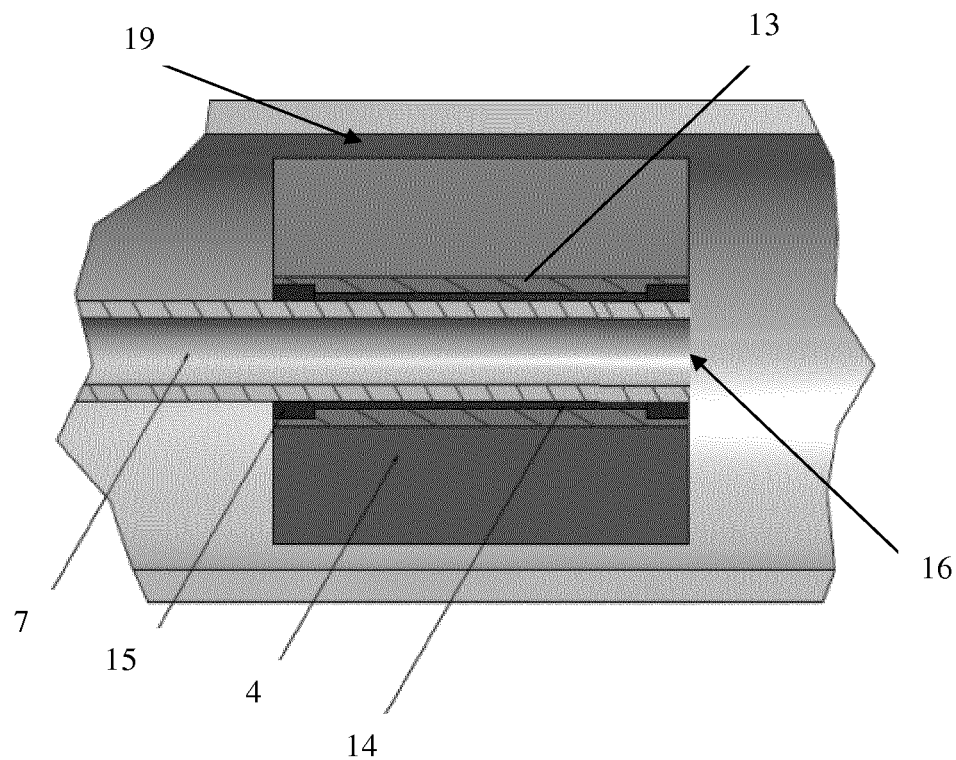
FIG. 3 is a longitudinal cross-sectional view of the pipe element of FIG. 2.

A swirl generating pipe element, wherein the stator element is removed is shown in FIG. 2. The SGPE comprises a pipe section 9 having an inlet 10 and an outlet 11 for a fluid. The pipe section is arranged between the stator element 1 and the rotor element 2, such that the stator element will not come into contact with a fluid passing through the pipe section 9. The rotor element 2 comprises multiple rotor poles 4 shaped as vanes, i.e. the rotor poles are part of a vane assembly. The rotor poles 4 are rotatably connected to the rotor shaft 7 by the sleeve 13. The rotor shaft 7 is an end part of an angled pipe element passing through the wall of the pipe section. In the present embodiment, the end 16 of the rotor shaft, see FIG. 3, is open, thus able to function as a fluid recirculation pipe for a separator as shown in FIG. 5. In other embodiments of the swirl generating pipe element, the rotor shaft may be arranged within the pipe section by use of any other suitable type of fastening means, such as multiple struts connected to the inner wall of the pipe section. When the rotor poles are induced to rotate around the rotor shaft, by applying a DC current to alternate stator poles of the stator element (not shown) arranged around the pipe section, a fluid entering the inlet 10 of the pipe section 9 will be forced into a swirling motion such that any liquid present in the fluid will be subjected to a centrifugal force pushing the liquid towards the inner wall of the pipe section. The centrifugal force is decided by both the rotational speed of the vanes and their blade angle. In the swirl generating pipe element of FIGS. 1-4, the blade angle is 0°, but may in other embodiments vary within the range of 0 to 30° depending on the expected flow conditions in a particular setting/application. When the rotor poles are shaped as vanes having a blade angle above 0°, the stator poles are curved if required to obtain alignment with the second end 6 of the rotor poles.

A longitudinal cross-sectional view of the SGPE in FIG. 2 is shown in FIG. 3. Bearings 15 between the sleeve 13 and the rotor shaft ensure that the friction between the sleeve and the rotor shaft, when the sleeve is forced to rotate, is minimized. In this particular embodiment, a layer 14 comprising a permanent magnetic material is arranged around the rotor shaft. The magnetic layer is not required, but may facilitate the magnetization of the rotor poles, and contribute to an increased torque.

To obtain a sufficient interaction between the stator poles and the rotor poles, the distance 19 between them should be as small as possible, and in any case should not exceed a given value. The given value is determined by both the materials used in the stator poles and the rotor poles, the size of the induced magnetic flux etc. In some cases, for instance when the SGPE is to be used for fluids having a very high pressure, the wall 8 of the pipe section 9 may be required to be of a thickness which is not compatible with obtaining a given value for the distance between the stator poles and the rotor poles. To overcome this problem, the part 18 of the pipe section separating the rotor element from the stator element may have a wall thickness lower than the remaining part of the pipe section, see FIG. 4. To compensate for the lower wall thickness, which would not be within the safety margins required, a pressure chamber 17 is arranged around the stator element 1 and the part 18 of the pipe section 9 featuring the lower wall thickness. The pressure in the pressure chamber is preferably at the same pressure as the fluid within the SGPE. The use of the pressure chamber 17 enables the use of a relatively thin barrier, i.e. the part 18 of the pipe section wall, to separate the rotor element 2 from the stator element 1, and will consequently allow for a small air gap. A small air gap between the rotor element and the stator element, or more specific between the rotor poles 4 and the stator poles 3, is necessary for obtaining a sufficiently high power density. For instance, the lower wall thickness of part 18 may be about 2 mm, with an additional 1 mm clearance between the rotor poles 4 and the inner wall (i.e. the internal circumferential surface) of the pipe section, resulting in a total air gap of 4 mm.

Figure 4:
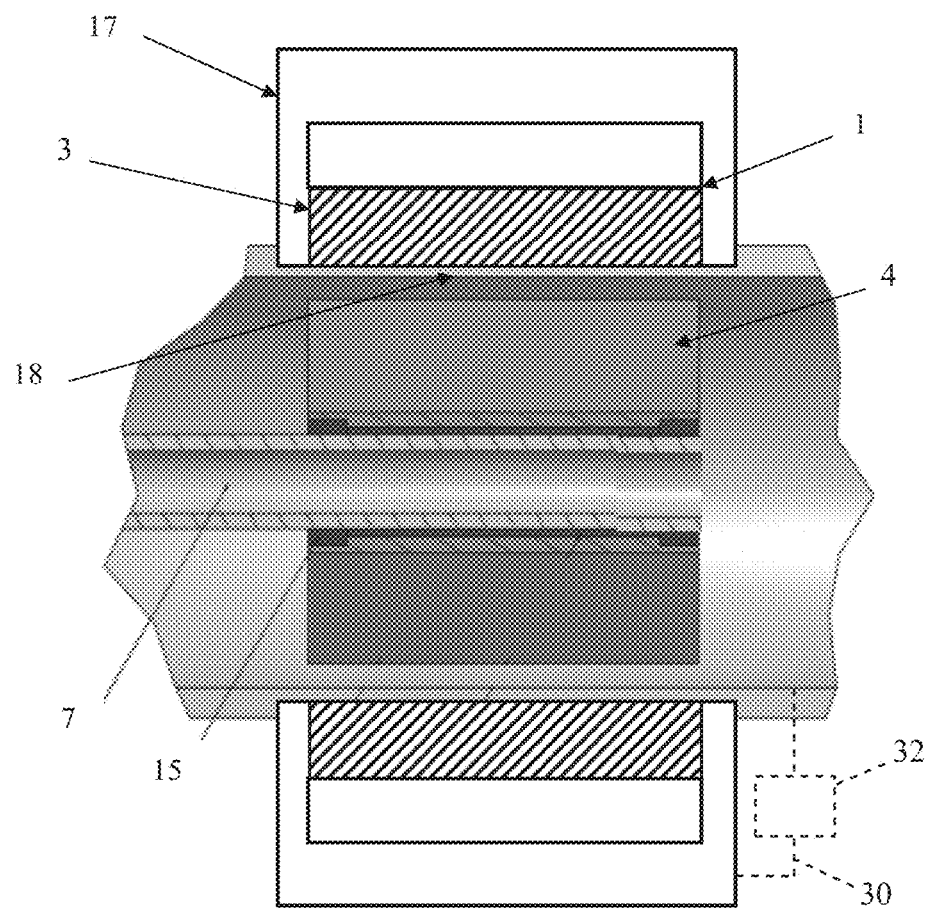
FIG. 4 is a longitudinal cross-sectional view of the pipe element in FIG. 2 featuring a stator element and a pressure chamber.
Figure 5:
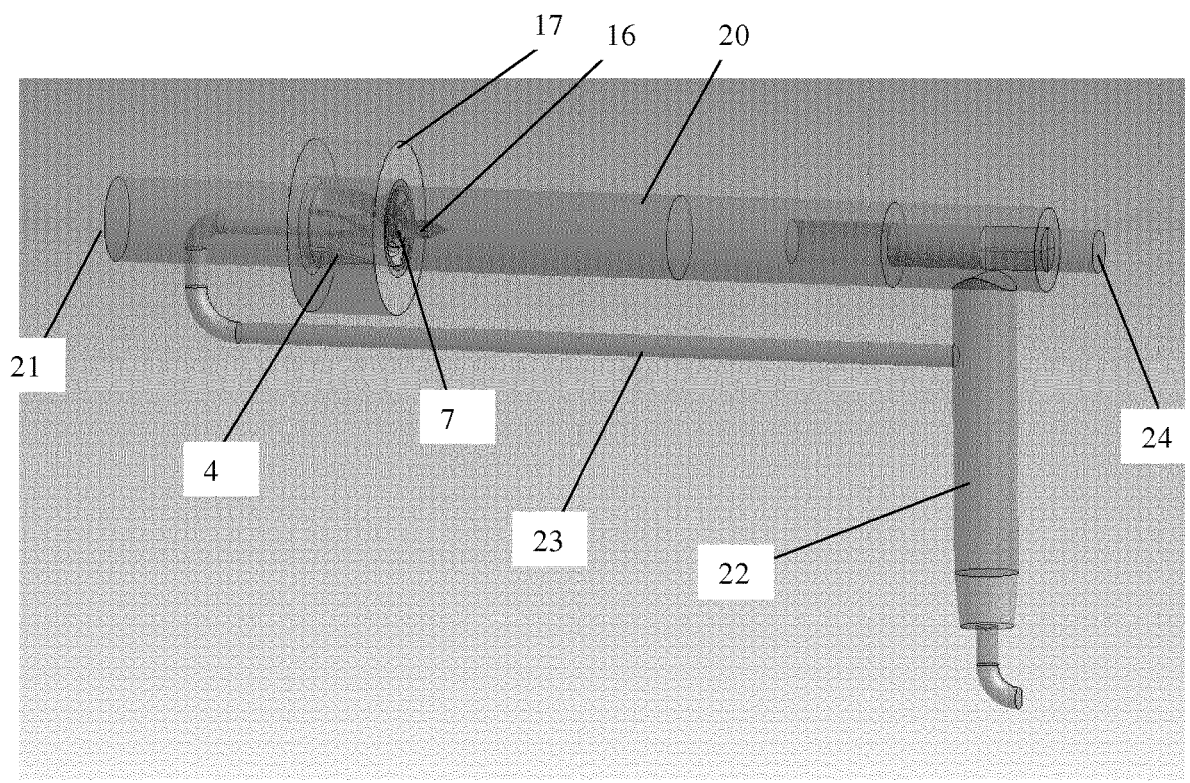
FIG. 5 is a perspective view of a separator comprising a swirl generating pipe element according to the invention.

In the SGPE of FIG. 4, the pressure chamber 17 is at a constant predetermined internal pressure. However, in other embodiments the SGPE may comprise a pressure chamber wherein the internal pressure is constantly regulated depending on the fluid pressure in the pipe section 9, i.e. the SGPE comprises pressure compensation means able to equalize the difference between the pressure of the pressure chamber and the fluid pressure in the pipe section. Such pressure compensation may be achieved by for instance filing filling the pressure chamber 17 with a suitable liquid and having said liquid in contact with the internal volume of the pipe section 9 via a pressure transferring system comprising a fluid line 30 and a piston or membrane assembly 32 (which are depicted in phantom in FIG. 4).

A preferred use of an SGPE, as described above, is in a liquid/gas separator or demister. In existing separators or demisters, the centrifugal force required to separate liquids from a gas is obtained by leading the gas/liquid stream through tangential inlets or static swirl vanes or blades. The pressure drop of the gas/liquid stream is significant in these separators, and they are also dependent on a minimum fluid flow rate to obtain the required centrifugal force.

A separator comprising an SGPE according to the invention is shown in FIG. 5. Such separators, except the features of the SGPE according to the invention, are well known in the prior art. For simplicity, the stator element 1 of the SGPE is only illustrated by the pressure chamber 17. The separator comprises a main pipe 20 including the SGPE. A fluid, for instance a gas/liquid mixture, to be separated enters the inlet 21 of the main pipe and is caused to rotate by passing through the SGPE. In this embodiment, the SGPE is shown with rotor poles 4 shaped as vanes having a blade angle of more than 0°. The centripetal force causes the liquid to migrate towards the wall of the main pipe and accumulate in the liquid booth 22. A major fraction of the gas exits the main pipe via the outlet 24 and a minor fraction is recirculated via recirculation pipe 23, which is connected to the angled pipe element and the rotor shaft 7, and reintroduced to the main pipe of the separator via the open end 16 in the rotor shaft.

The disclosed invention can be used for separating any type of liquid (e.g. water, hydrocarbon liquids, liquefied $CO_2$ etc.) from any gas dominant fluid stream.

Although not part of the present invention, a similar pipe element may be used for generating electrical power from a fluid stream. The main features distinguishing such a power generating pipe element from the SGPE according to the invention, is the fact that the vanes must have a blade angle forcing the rotor poles to rotate due to a passing fluid stream and the use of different control strategies, ref. Arifin et al, Energy and Power Engineering, 2012, 4, 447-458. A system for supplying electrical power to a subsea installation by use of a fluid pipe connected to a generator is disclosed in WO 2005/078233 A1. A pipe element for generating electrical power as described above may be used in such a system.

The invention claimed is:

1. A liquid/gas separator for separating a liquid from a gas-dominant fluid stream, the liquid/gas separator comprising a swirl generating pipe element for providing a rotational movement to the fluid, the swirl generating pipe element comprising a reluctance motor and a pipe section, wherein:
   the reluctance motor comprises a stator element and a rotor element;
   the stator element comprises multiple stator poles;
   the rotor element comprises a vane assembly having multiple rotor poles which define a plurality of vanes of the vane assembly, the vane assembly being arranged to rotate around a rotor shaft which is connected to and situated along a centerline of the pipe section, and each rotor pole having a first end rotatably connected to the rotor shaft and a second end arranged sufficiently close to one of the multiple stator poles for a magnetic polarization to be induced in the rotor pole;
   the pipe section comprises a wall having external and internal circumferential surfaces and an inlet and a first outlet for the fluid stream;
   the stator element and the rotor element are separated by the wall of the pipe section, the multiple stator poles are arranged at the external circumferential surface of the pipe section, and the second ends of the multiple rotor poles are arranged adjacent to the internal circumferential surface of the pipe section, such that in operation of the swirl generating pipe element, the vane assembly rotates to thereby cause the vanes to impart a rotational movement to the fluid entering the inlet of the pipe section; and
   the separator comprises a second outlet in communication with the pipe section for the liquid separated from the fluid stream.

2. The swirl generating pipe element according to claim 1, wherein at least a part of the rotor poles are shaped as vanes.

3. The swirl generating pipe element according to claim 1, wherein the rotor shaft is pipe-shaped so as to provide a fluid passage through a centerline of the rotor element.

4. The swirl generating pipe element according to claim 1, wherein the pipe section comprises a part separating the rotor element from the stator element and having a wall thickness less than a wall thickness of a remaining part of the pipe section.

5. The swirl generating pipe element according to claim 4, wherein the stator element and an outer circumferential surface of the pipe section are enclosed in a pressure chamber.

6. The swirl generating pipe element according to claim 5, further comprising pressure compensation means for equalizing the pressure in the pressure chamber and the pressure in the pipe section.

7. The swirl generating pipe element according to claim 1, wherein the first end of each of the multiple rotor poles is rotatably connected to the rotor shaft by a sleeve which is arranged around the rotor shaft.

8. The swirl generating pipe element according to claim 7, wherein a layer comprising a permanent magnetic material is arranged between the rotor shaft and the sleeve.

9. The swirl generating pipe element according to claim 7, further comprising at least one set of bearings arranged between the rotor shaft and the sleeve.

10. A liquid/gas separator for separating a liquid from a gas-dominant fluid stream, the liquid/gas separator comprising a swirl generating pipe element which includes:
   a pipe section which comprises a wall having external and internal circumferential surfaces and an inlet and a first outlet for the fluid stream;
   a reluctance motor which comprises a stator element and a rotor element;
   the stator element comprising multiple stator poles; and
   the rotor element comprising a vane assembly having multiple rotor poles which define a plurality of vanes of the vane assembly, the vane assembly being arranged to rotate around a rotor shaft which is connected to and situated along a centerline of the pipe section, each rotor pole having a first end which is rotatably connected to the rotor shaft and a second end which is arranged adjacent the internal circumferential surface of the pipe section;
   wherein the multiple stator poles are arranged at the external circumferential surface of the pipe section and the stator element and the rotor element are separated by the wall of the pipe section;
   wherein in operation of the liquid/gas separator, the vane assembly rotates to thereby cause the vanes to impart a rotational movement to a fluid stream entering the inlet of the pipe section; and
   wherein the separator comprises a second outlet in communication with the pipe section for the liquid separated from the fluid stream.

11. The liquid/gas separator according to claim 10, wherein the first end of each of the multiple rotor poles is rotatably connected to the rotor shaft by a sleeve which is arranged around the rotor shaft.

12. The liquid/gas separator according to claim 11, further comprising at least one set of bearings arranged between the rotor shaft and the sleeve.

13. The liquid/gas separator according to claim 12, further comprising a layer of a permanent magnetic material which is positioned between the rotor shaft and the sleeve.

14. The liquid/gas separator according to claim 10, wherein a portion of the pipe section which is positioned between the rotor element and the stator element has a wall thickness which is less than a wall thickness of a remainder of the pipe section.

15. The liquid/gas separator according to claim 14, wherein the stator element is enclosed in a pressure chamber.

16. The liquid/gas separator according to claim 15, further comprising pressure compensation means for equalizing the pressure in the pressure chamber and the pressure in the pipe section.

17. The liquid/gas separator according to claim 10, wherein the rotor shaft is hollow so as to provide a fluid passage through a centerline of the rotor element.

18. A method for separating a liquid from a gas-dominant fluid stream which comprises:
   directing a fluid stream through a swirl generating pipe element which includes a pipe section and a reluctance motor, the pipe section comprising a wall having external and internal circumferential surface and an inlet and a first outlet for the fluid stream;
   the reluctance motor comprising a stator element and a rotor element;
   the stator element comprising multiple stator poles; and
   the rotor element comprising a vane assembly having multiple rotor poles which define a plurality of vanes of the vane assembly, the vane assembly being arranged to rotate around a rotor shaft which is connected to and situated along a centerline of the pipe section, each rotor pole having a first end which is rotatably connected to the rotor shaft and a second end which is arranged adjacent the internal circumferential surface of the pipe section;
   wherein the multiple stator poles are arranged at the external circumferential surface of the pipe section and the stator element and the rotor element are separated by the wall of the pipe section;
   wherein in operation of the swirl generating pipe element, the vane assembly rotates to thereby cause the vanes to impart a rotational movement to the fluid stream; and
   wherein the separator comprises a second outlet in communication with the pipe section for the liquid separated from the fluid stream.

* * * * *